(12) United States Patent
Andreas et al.

(10) Patent No.: US 6,807,475 B2
(45) Date of Patent: Oct. 19, 2004

(54) METHOD FOR CONTROLLING THE SPEED AND DISTANCE OF A MOTOR VEHICLE

(75) Inventors: Peter Andreas, Gifhorn (DE); Thomas Ruchatz, Lehre (DE); Wolfgang Baeker, Braunschweig (DE); Heiko Rabba, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/203,057

(22) PCT Filed: Jan. 31, 2001

(86) PCT No.: PCT/EP01/01028

§ 371 (c)(1),
(2), (4) Date: Nov. 11, 2002

(87) PCT Pub. No.: WO01/56825

PCT Pub. Date: Aug. 9, 2001

(65) Prior Publication Data
US 2003/0132046 A1 Jul. 17, 2003

(30) Foreign Application Priority Data

Feb. 2, 2000 (DE) .......................................... 100 04 527

(51) Int. Cl.$^7$ ................................................. B62B 1/24
(52) U.S. Cl. .......................... 701/96; 180/167; 180/170
(58) Field of Search ............................ 701/96, 2, 23, 701/24; 340/903; 180/168

(56) References Cited

U.S. PATENT DOCUMENTS

| 5,781,119 A | * | 7/1998 | Yamashita et al. ........... 340/903 |
| 6,169,940 B1 | * | 1/2001 | Jitsukata et al. ............... 701/23 |

FOREIGN PATENT DOCUMENTS

| DE | 195 43 551 | 5/1996 |
| DE | 197 29 613 | 1/1998 |
| DE | 196 47 430 | 5/1998 |
| EP | 0 484 995 | 5/1992 |
| EP | 0 897 824 | 2/1999 |

* cited by examiner

Primary Examiner—Marthe Y. Marc-Coleman
(74) Attorney, Agent, or Firm—Kenyon & Kenyon

(57) ABSTRACT

The present invention relates to a method for controlling the speed of a motor vehicle and the distance of the motor vehicle to least one motor vehicle driving ahead, where at least the speed v of the motor vehicle and the distance a to the motor vehicle driving ahead are determined with the aid of a detector having a distance sensor, where the traveling speed v is adjusted in response to the measured distance a deviating from a setpoint trailing distance $a_s$, and where the engineering problem of controlling the speed and the distance of a motor vehicle to least one preceding motor vehicle is solved in both a simple and reliable manner, in that an intervention distance $a_i'$ is determined which is less than the range of the distance sensor, and that the traveling speed v is adjusted at a distance a which is less than the intervention distance ai.

16 Claims, 1 Drawing Sheet

METHOD FOR CONTROLLING THE SPEED AND DISTANCE OF A MOTOR VEHICLE

Figure 1:
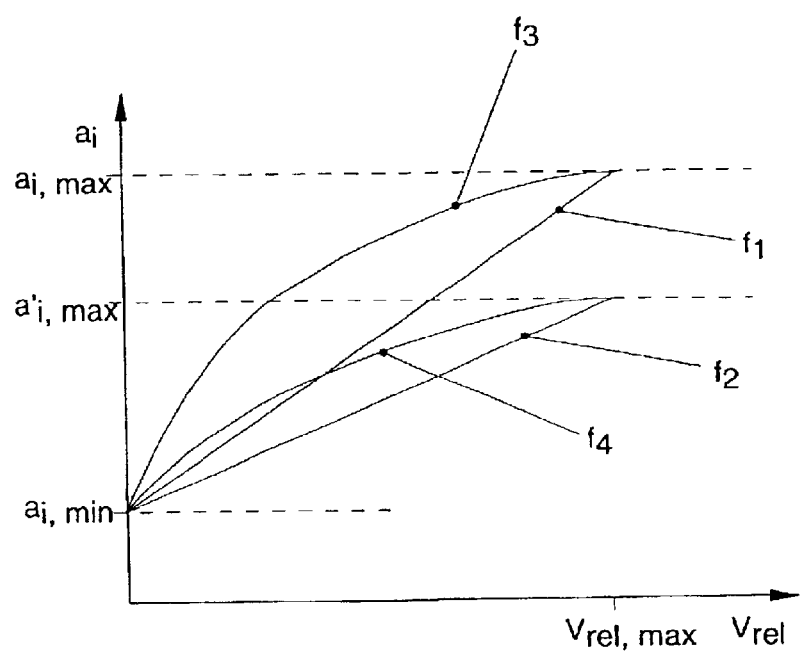

This application is a 371 of PCT/EP01/01028 filed Jan. 31, 2001.

The present invention relates to a method for controlling the speed of a motor vehicle and the distance of the motor vehicle to at least one motor vehicle driving ahead, in which at least the speed of the motor vehicle and the distance to the motor vehicle driving ahead are determined with the aid of a detector having a distance sensor, and in which the driving speed is adjusted in response to detected distance a deviating from a setpoint trailing distance.

A method and a braking device for automatically decelerating a motor vehicle driven by a person is known from DE 196 47 430 A. In this context, the speed relative to an obstacle situated in front of the vehicle, approximately in the direction of travel, and the distance between the vehicle and the obstacle, are ascertained. The ascertained distance is compared to a vehicle braking distance for a speed that approximately corresponds to the relative speed. An automatic braking action is at least partially carried out as a function of the result of the comparison, when the ascertained distance is less than the specified braking distance.

In addition, DE 197 29 613 A describes a driving-support system for vehicles, by which a driver is instructed to pay attention to a vehicle driving ahead when a vehicle approaches the preceding vehicle and the distance between these two vehicles becomes smaller than a safe vehicle distance, this safe vehicle distance being established in two stages in accordance with traffic conditions. One stage corresponds to a state of low traffic density, in which the road is free or has little traffic or is not frequently used, and the second step corresponds to a state of high traffic density, in which the road is crowded or heavily traveled. Since, in the state of high traffic density, the safe vehicle distance is set to be less than that for the state of low traffic density, the frequent output of a warning signal due to the smaller safe vehicle distance is prevented when the road is heavily traveled.

The above-mentioned method for controlling the speed and distance of a motor vehicle is based on the problem that the methods known from the related art immediately start to control the distance when a new object, i.e. a new motor vehicle driving ahead, is detected by the detector. In this context, it is not taken into consideration that, since the control object may be traveling in another lane, the newly detected object may not represent an actual control object for the controlled motor vehicle. This especially occurs during cornering, where the motor vehicle is driving in the passing lane and a new control object is detected, which is traveling in the right lane and only ends up in the detection range of the detector due to the shape of the curve. Therefore, the present invention is based on the engineering problem of specifying a method, which controls the speed and the distance of the motor vehicle to at least one motor vehicle driving ahead, in a manner that is simpler and, at the same time, more reliable.

The above-mentioned engineering problem is solved by a method of the present invention according to claim 1, in that an intervention distance $a_i$, which is less than the range of the distance sensor, is determined, and that traveling speed v is adjusted at a distance a, which is less than intervention distance $a_i$. As long as the new control object is situated between the radius of action of the distance sensor and the intervention distance, the use of the described intervention distance allows the control object to be initially monitored, in order to ascertain its driving behavior. The distance is only controlled in a customary manner, when the distance falls below the intervention distance.

The maximum intervention distance is preferredly defined to be less than 90%, preferably less than 80%, and especially less than 70% of the range of the distance sensor. Therefore, the distance range in which the control object is only monitored without the motor vehicle being controlled, lies in the area of 10 to 30% of the range of the distance sensor, so that a sufficient monitoring time is provided for all driving situations.

It is particularly preferable for the intervention distance to be determined as a function of the relative speed of the motor vehicle and a motor vehicle driving ahead. This is based on the realization that, for different relative speeds, different braking times are required for adjusting the distance of the controlled motor vehicle to the safe distance given. Large relative speeds require a longer braking time, while smaller relative speeds require shorter braking times.

In a further, preferred manner, the intervention distance is calculated as a continuously increasing function of the relative speed, the function being either a linear or a non-linear function. In the case of a linear function, the intervention distance, starting from a minimum intervention distance, linearly increases according to a preset slope, as a function of the relative speed. In the case of a nonlinear function, the slope is greater for low relative-speed values than for high relative speeds. Finally, it is recognized that the braking distance increases superproportionally to the relative speed, since the traveling energy is a quadratic function of the traveling speed. In comparison with a linear function, the described, nonlinear curve of the function tends to cause higher intervention distances to be calculated for increasing values of the relative speed.

Because of the same idea that the kinetic energy quadratically increases with the traveling speed, the values for the minimum intervention distance and the maximum intervention distance are calculated in a further preferred manner, as a function of the traveling speed.

It is equally possible to calculate the values for the minimum intervention distance and the maximum intervention distance as a function of the type of road that is used. In so doing, the type of road may be input by the user or determined, using the frequency of curves driven through per unit time, or using data of a positioning system, preferably a global positioning system (GPS). Since one normally travels at higher speeds on expressways than on country roads or even urban roads, the intervention distances may be determined as a function of the type of road used.

The present invention is explained below in detail in light of an exemplary embodiment, where reference is made to the enclosed drawing. The drawing's one FIGURE, which is in the form of a diagram, shows the plots of different functions for calculating the intervention distance.

In the FIGURE, intervention distance $a_i$ is plotted versus relative speed $v_{rel}$. The values of the minimum intervention distance $a_{i,min}$ and two maximum intervention distances $a_{i,max}$ and $a'_{i,max}$ are represented by dotted lines. The values of maximum intervention distances $a_{i,max}$ and $a'_{i,max}$ are less than the range of a distance sensor of the detector used. For example, the range may be approximately 150 to 200 m. If an object is now detected anew by the sensor and the measured distance to the control object is in the range of the sensor, then the present invention provides for the new control object being initially monitored before the distance of the motor vehicle is controlled. Intervention distance $a_i$ is provided for this purpose, so that the traveling speed is first controlled as of a distance a, which is less than intervention distance $a_i$. As is shown in the FIGURE, intervention distance $a_i$ may be defined to be a constant function, which is represented in the diagram, for $a_{i,max}$ or $a'_{i,max}$, by horizontal dotted lines.

The other curves represent functions, with the aid of which intervention distance $a_i$ is determined as a function of relative speed $v_{rel}$. All of the functions $f_1$ through $f_4$ represented are continuously increasing functions $a_i(v_{rel})$.

Functions $f_1$ and $f_2$ are linear functions, which are calculated in the form $$a_i(v_{rel}) = a_{i,min} + const \cdot v_{rel}$$

where $a_{i,min}$ is the minimum intervention distance. In this context, functions $f_1$ and $f_2$ are only distinguished by different slope values and, therefore, different maximum values for intervention distance $a_{i,max}$.

The curves $f_3$ and $f_4$ are nonlinear functions, whose slopes are larger for small values of relative speed vrel than for large values of relative speed vrel. This yields functional curves $f_3$ and $f_4$ which, for smaller relative speeds, have a slope that is greater than that of the associated linear functions $f_1$ and $f_2$, while, for larger relative speeds vrel, the slopes are less than those of linear functions $f_1$ and $f_2$. This functional curve satisfies the realization that, in the case of high relative speeds, a greater braking distance is required, and therefore, greater intervention distances should be specified, than in the case of a linear function.

Two different values of the maximum intervention distance, $a_{i,max}$ and $a'_{i,max}$, are represented in the FIGURE. The shorter the maximum intervention distance of a function that is a function of relative speed vrel, the larger the distance range in which a newly detected control object may be monitored before the distance is controlled. Therefore, different maximum and minimum intervention distances may be determined as a function of traveling speed v. It is equally possible to determine minimum and maximum intervention distances $a_{i,min}$ and $a_{i,max}$ as a function of the type of road that is used, for one drives at higher average traveling speeds on expressways than on country roads, and especially urban roads, so that correspondingly modified, maximum and minimum intervention distances $a_{i,min}$ and $a_{i,max}$ may be specified. In so doing, the type of road may be specified by a user, or it is determined, using the frequency of curves driven through per unit time, or using data of a positioning system, preferably a global positioning system (GPS).

What is claimed is:

1. A method for controlling a speed of a first motor vehicle and a distance of the first motor vehicle to a least one second motor vehicle driving ahead, comprising the steps of:
   determining at least the speed of the first motor vehicle and the distance to the second motor vehicle driving ahead in accordance with a detector having a distance sensor;
   determining an intervention distance having a maximum value that is a predetermined amount less than a range of the distance sensor; and
   adjusting the speed of the first motor vehicle in response to the distance deviating from a setpoint trailing distance;
   wherein the speed is adjusted in the adjusting step in accordance with a distance that is less than the intervention distance and wherein the speed is not adjusted in the adjusting step in accordance with a distance in a range that is greater than or equal to the intervention distance and less than the range of the distance sensor.

2. A method for controlling a speed of a first motor vehicle and a distance of the first motor vehicle to a least one second motor vehicle driving ahead, comprising the steps of:
   determining at least the speed of the first motor vehicle and the distance to the second motor vehicle driving ahead in accordance with a detector having a distance sensor;
   determining an intervention distance less than a range of the distance sensor; and
   adjusting the speed of the first motor vehicle in response to the distance deviating from a setpoint trailing distance;
   wherein the speed is adjusted in the adjusting step in accordance with a distance that is less than the intervention distance and wherein the speed is not adjusted in the adjusting step in accordance with a distance that is greater than or equal to the intervention distance; and
   wherein a maximum intervention distance is less than 90% of the range of the distance sensor.

3. A method for controlling a speed of a first motor vehicle and a distance of the first motor vehicle to a least one second motor vehicle driving ahead, comprising the steps of:
   determining at least the speed of the first motor vehicle and the distance to the second motor vehicle driving ahead in accordance with a detector having a distance sensor;
   determining an intervention distance less than a range of the distance sensor; and
   adjusting the speed of the first motor vehicle in response to the distance deviating from a setpoint trailing distance;
   wherein the speed is adjusted in the adjusting step in accordance with a distance that is less than the intervention distance and wherein the speed is not adjusted in the adjusting step in accordance with a distance that is greater than or equal to the intervention distance; and
   wherein a maximum intervention distance is less than 80% of the range of the distance sensor.

4. A method for controlling a speed of a first motor vehicle and a distance of the first motor vehicle to a least one second motor vehicle driving ahead, comprising the steps of:
   determining at least the speed of the first motor vehicle and the distance to the second motor vehicle driving ahead in accordance with a detector having a distance sensor;
   determining an intervention distance less than a range of the distance sensor; and
   adjusting the speed of the first motor vehicle in response to the distance deviating from a setpoint trailing distance;
   wherein the speed is adjusted in the adjusting step in accordance with a distance that is less than the intervention distance and wherein the speed is not adjusted in the adjusting step in accordance with a distance that is greater than or equal to the intervention distance; and
   wherein a maximum intervention distance is less than 70% of the range of the distance sensor.

5. A method for controlling a speed of a first motor vehicle and a distance of the first motor vehicle to a least one second motor vehicle driving ahead, comprising the steps of:
   determining at least the speed of the first motor vehicle and the distance to the second motor vehicle driving ahead in accordance with a detector having a distance sensor;

determining an intervention distance less than a range of the distance sensor;

adjusting the speed of the first motor vehicle in response to the distance deviating from a setpoint trailing distance; and determining the relative speed of the first motor vehicle and the second motor vehicle driving ahead;

wherein the speed is adjusted in the adjusting step in accordance with a distance that is less than the intervention distance and wherein the speed is not adjusted in the adjusting step in accordance with a distance that is greater than or equal to the intervention distance; and wherein the intervention distance is determined in the intervention distance determining step as a function of the relative speed.

6. The method according to claim 5, wherein the intervention distance is calculated in the intervention distance determining step as a continuously increasing function of the relative speed.

7. The method according to claim 6, wherein the function is calculated as a linear function having the form $$a_i(v_{rel}) = a_{i,min} + \text{const} \cdot v_{rel};$$

wherein $a_i(v_{rel})$ represents the function;

wherein $a_{i,min}$ represents a minimum intervention distance; and wherein $v_{rel}$ represents the relative speed.

8. The method according to claim 6, wherein the function is calculated as a nonlinear function, a slope of the nonlinear function larger for small values of the relative speed than for large values of the relative speed.

9. A method for controlling a speed of a first motor vehicle and a distance of the first motor vehicle to a least one second motor vehicle driving ahead, comprising the steps of:

determining at least the speed of the first motor vehicle and the distance to the second motor vehicle driving ahead in accordance with a detector having a distance sensor;

determining an intervention distance less than a range of the distance sensor;

adjusting the speed of the first motor vehicle in response to the distance deviating from a setpoint trailing distance; and determining values of a minimum intervention distance and a maximum intervention distance as a function of the speed;

wherein the speed is adjusted in the adjusting step in accordance with a distance that is less than the intervention distance and wherein the speed is not adjusted in the adjusting step in accordance with a distance that is greater than or equal to the intervention distance.

10. A method for controlling a speed of a first motor vehicle and a distance of the first motor vehicle to a least one second motor vehicle driving ahead, comprising the steps of:

determining at least the speed of the first motor vehicle and the distance to the second motor vehicle driving ahead in accordance with a detector having a distance sensor;

determining an intervention distance less than a range of the distance sensor; and adjusting the speed of the first motor vehicle in response to the distance deviating from a setpoint trailing distance; and determining values of a minimum intervention distance and a maximum intervention distance as a function of a type of road;

wherein the speed is adjusted in the adjusting step in accordance with a distance that is less than the intervention distance and wherein the speed is not adjusted in the adjusting step in accordance with a distance that is greater than or equal to the intervention distance.

11. The method according to claim 10, further comprising the step of inputting the type of road by a user.

12. The method according to claim 10, further comprising the step of determining the type of road in accordance with at least one of a frequency and a number of curves driven through per unit time.

13. The method according to claim 10, further comprising the step of determining the type of road in accordance with data of a positioning system.

14. The method according to claim 13, wherein the positioning system includes a global positioning system.

15. A device for controlling a speed of a first motor vehicle and a distance of the first motor vehicle to a least one second motor vehicle driving ahead, comprising:

means for determining at least the speed of the first motor vehicle and the distance to the second motor vehicle driving ahead in accordance with detector means having distance sensing means;

means for determining an intervention distance having a maximum value that is a predetermined amount less than a range of the distance sensing means; and means for adjusting the speed of the first motor vehicle in response to the distance deviating from a setpoint trailing distance;

wherein the speed is adjusted by the adjusting means in accordance with a distance that is less than the intervention distance and wherein the speed is not adjusted by the adjusting means in accordance with a distance in a range that is greater than or equal to the intervention distance and less than the range of the distance sensing means.

16. A device for controlling a speed of a first motor vehicle and a distance of the first motor vehicle to a least one second motor vehicle driving ahead, comprising:

an arrangement configured to determine at least the speed of the first motor vehicle and the distance to the second motor vehicle driving ahead in accordance with detector having a distance sensor;

an arrangement configured to determine an intervention distance having a maximum value that is a predetermined amount less than a range of the distance sensor; and an arrangement configured to adjust the speed of the first motor vehicle in response to the distance deviating from a setpoint trailing distance;

wherein the arrangement configured to adjust the speed of the first motor vehicle is configured to adjust the speed in accordance with a distance that is less than the intervention distance and to not adjust the speed in accordance with a distance in a range that is greater than or equal to the intervention distance and less than the range of the distance sensor.

* * * * *